US00RE34844E

United States Patent [19]

Ito et al.

[11] E Patent Number: Re. 34,844

[45] Reissued Date of Patent: Jan. 31, 1995

[54] POWER TILT DEVICE

[75] Inventors: Hiroshi Ito, Shizuoka; Ryoichi Nakase, Hamamatsu, both of Japan

[73] Assignee: Sanshin Kogyo Kabushiki Kaisha, Hamamatsu, Japan

[21] Appl. No.: 51,978

[22] Filed: Apr. 26, 1993

Related U.S. Patent Documents

Reissue of:

[64] Patent No.: 5,049,099
Issued: Sep. 17, 1991
Appl. No.: 567,697
Filed: Aug. 13, 1990

U.S. Applications:

[63] Continuation of Ser. No. 390,656, Aug. 7, 1989, abandoned, which is a continuation of Ser. No. 619,054, Jun. 11, 1984, abandoned.

[30] Foreign Application Priority Data

Jun. 11, 1984 [JP] Japan ..... 58-105766

[51] Int. Cl.[6] ..... B63H 5/12

[52] U.S. Cl. ..... 440/61

[58] Field of Search ..... 440/2, 53, 56, 61, 65; 248/640, 641; 92/13, 19, 13.51, 26, 75, 85 B; 91/422

[56] References Cited

U.S. PATENT DOCUMENTS

| | | | |
|---|---|---|---|
| 3,473,325 | 10/1969 | Vargo | 440/61 |
| 3,581,702 | 6/1971 | Moberg | 440/61 |
| 3,722,455 | 3/1973 | Carpenter | 440/61 |
| 3,839,986 | 10/1974 | Meyer et al. | 440/61 |
| 4,232,627 | 11/1980 | Glenn et al. | 440/61 |
| 4,325,700 | 4/1982 | Kern et al. | 440/61 |

*Primary Examiner*—Jesus D. Sotelo
*Attorney, Agent, or Firm*—Knobbe, Martens, Olson & Bear

[57] ABSTRACT

A compact self-contained trim and tilt unit for a marine outboard drive that can be nested between the supporting brackets of the outboard drive so that all components are protected and so that external piping is avoided.

12 Claims, 2 Drawing Sheets

POWER TILT DEVICE

Matter enclosed in heavy brackets [ ] appears in the original patent but forms no part of this reissue specification; matter printed in italics indicates the additions made by reissue.

This is a continuation of U.S. Pat. application Ser. No. 390,656, filed Aug. 7, 1989; which application is based on a continuation of Ser. No. 619,054, filed June 11, 1984, both now abandoned.

BACKGROUND OF THE INVENTION

This invention relates to a power tilt device and more particularly to an improved, simplified and compact power tile device for the outboard drive of a marine propulsion unit.

It has been the practice to provide a power unit for tilting the outboard drive of a marine propulsion unit. But the term "outboard drive", reference is made to either the outboard drive portion of an inboard-outboard marine propulsion unit or an outboard motor per se. In connection with such units, particularly those of the larger horsepower range, the use of a power tilt and trim unit has many advantages. Such units normally includes a fluid motor for effecting the pivotal movement, a pump for supplying fluid under pressure to the fluid motor and a drive unit for the pump such as an electric motor. In some of these arrangements, the pump, fluid motor and electric motor are all contained as a single unit. However, the previous arrangements embodying such single units have exposed the electric motor and pump in a location so that they could be readily damaged. That is, with such unitary assemblies of the type heretofore proposed, the motor and pump are exposed in an area where they may be struck by other objects and become damaged.

Alternatively, it has been proposed to position the electic motor and driven pump internally of the watercraft and to connect the pump to the fluid motor by means of fluid lines that extend externally of the hull. Such arrangements are not particularly desirable because the additional fluid lines form a source of possible leakage, the lines are positioned where they themselves could be damaged, and the remote positioning increases the amount of fluid which must be contained in the system for it to be operative.

It is, therefore, a principal object of this invention to provide an improved, compact power tilt and trim unit for an outboard drive.

It is a further object of this invention to provide a unitary pump and fluid motor arrangement for the tilt and trim unit of an outboard drive wherein the components are mounted in such a way that they are protected It is a yet further object of this invention to provide an improved, compact pump and fluid motor for a marine power trim and tilt unit which can be conveniently positioned within the outboard drive and protected by it from damage.

SUMMARY OF THE INVENTION

A first feature of this invention is adapted to be embodied in a power tilt and trim unit for a marine outboard drive that includes supporting means for supporting the outboard drive by the hull of a watercraft for pivotal movement about a generally horizontally extending tilt axis. A fluid motor is operatively connected between the hull and the outboard drive for effecting pivotal movement of the outboard drive upon actuation of the fluid motor. A pump supplies actuating fluid to the fluid motor and drive means operate the pump. In accordance with this feature of the invention, the pump and its drive means are positioned in proximity to the fluid motor and relative to the fluid motor, outboard drive and supporting means so as to be protected by these components.

Another feature of the invention is adapted to be embodied in a fluid motor and drive arrangement for controlling the angular position of a marine outboard drive relative to the hull of a watercraft comprising a linear fluid motor comprising a cylinder assembly and a piston assembly supported for relative reciprocation. Each of the assemblies has means for operatively connecting it to one of the hull and outboard drive. A fluid pump is carried by one of the assemblies and is operative to pressurize the fluid motor for actuating the fluid motor and a drive motor is provided for the fluid pump that is carried by the one assembly. The drive motor for the fluid pump has it rotational axis disposed parallel to the axis of reciprocation of the fluid motor.

DETAILED DESCRIPTION OF THE PREFERRED EMBODIMENT

Figure 1:
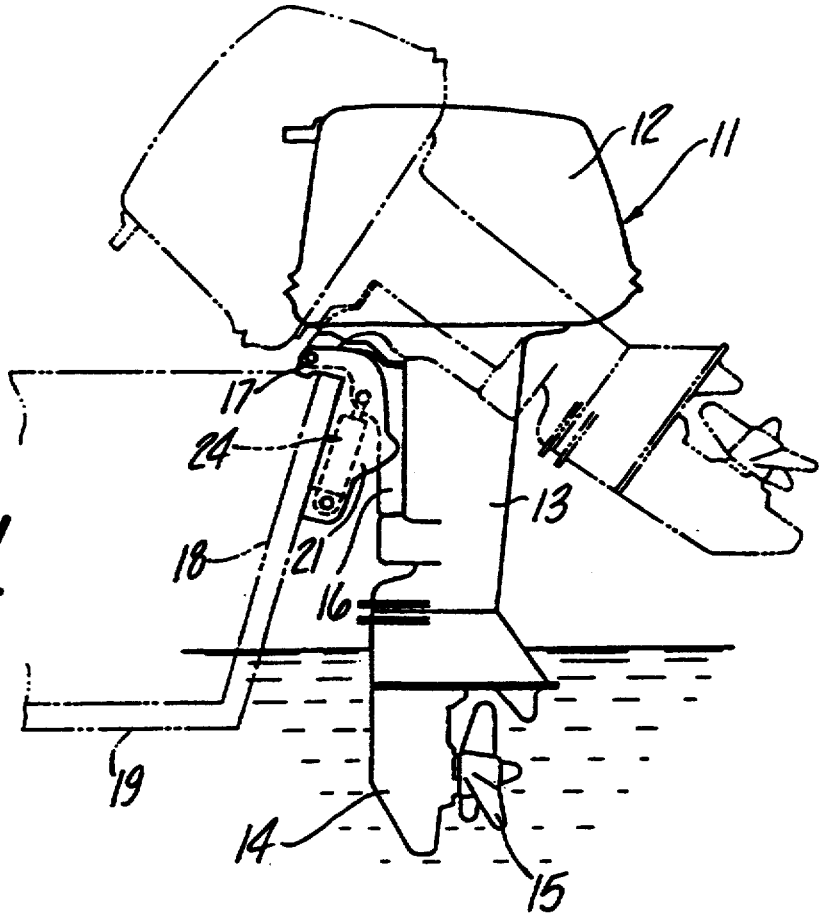
FIG. 1 is a side elevational view of an outboard motor having a tilt and trim unit constructed in accordance with an embodiment of the inventions as attached to the hull of an associated watercraft. The solid line view shown the outboard motor in its normal tilted down running condition and the phantom line view shows the outboard motor in a tilted up condition.
Figure 2:
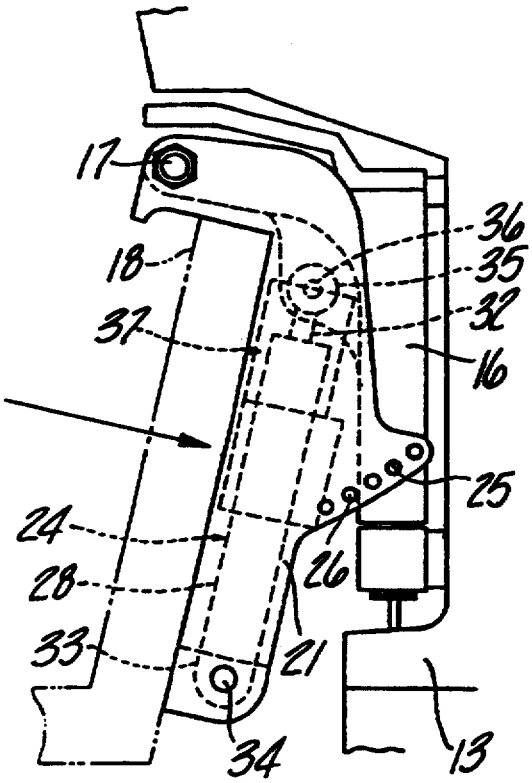
FIG. 2 is an enlarged side elevational view showing the mounting arrangement and tilt and trim device.
Figure 3:
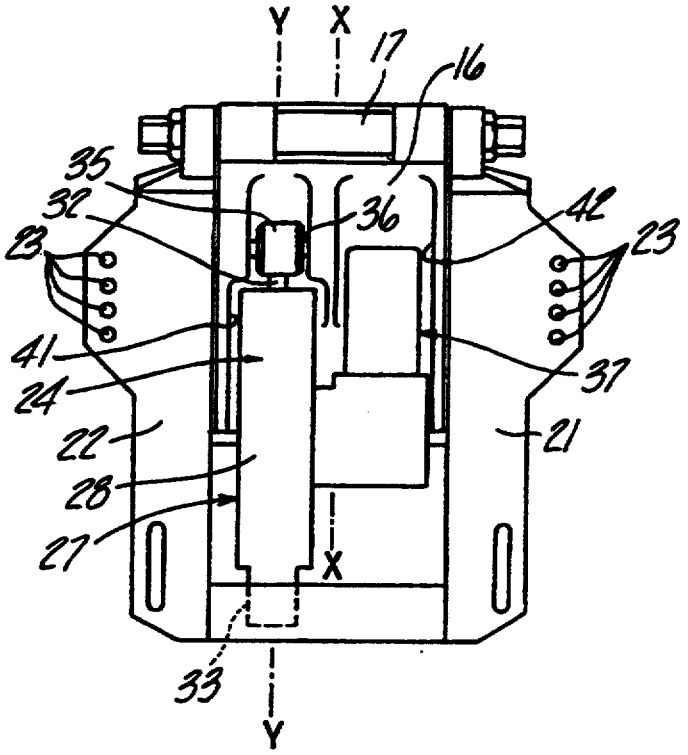
FIG. 3 is an enlarged front plan view looking generally in the direction of the arrow 3 in FIG. 2.

An outboard motor having a tilt and trim unit constructed in accordance with the invention is identified generally by the reference numeral 11. Although the invention is described in conjunction with an outboard motor, it may also be used with equal facility with the outboard drive of an inboard-outboard unit. However, the invention may have certain particularly advantages in connection with an outboard motor.

The outboard motor 11 includes a power head 12 having an internal combustion engine and which drives a drive shaft (not shown) that extends vertically through a drive shaft housing 13. At its lower end, the drive shaft terminates at a forward, neutral, reverse transmission that is contained within a lower unit 14 for driving a propeller 15 in a known manner. Since the construction and operation of the outboard motor 11 per se forms no part of the invention, it has not been described in detail.

The drive shaft housing 13 contains a steering shaft (not shown) which is journaled about a vertically extending steering axis by means of a swivel assembly 16 for steering of the motor 11 in a known manner. The swivel assembly 16 is, in turn, supported for tilting movement about a horizontally extending tilt axis by means of a tilt pin 17. The tilt pin 17 is affixed to a transom 18 of a watercraft which is illustrated in phantom and is identified by the reference numeral 19 by means of a pair of spaced apart clamping brackets 21 and 22. The clamping brackets 21 and 22 are affixed to the transom 18 in any known manner as by means of clamps or, as in the illustrated embodiment, by means of a plurality of apertures 23 that are formed in the respective clamping brackets 21 and 22 for screw attachment to the transom 18.

A hydraulically operated tilt and trim assembly, indicated generally by the reference number 24 is interposed between the transom 18 and outboard motor 11 for tilting the outboard motor 11 between a normal running condition, as shown in FIG. 1 in solid line views, and a plurality of trim adjusted and tilted up positions, the latter of which is shown in phantom line views. The trim adjusted position is set by means of a plurality of spaced apertures 25 that are formed in the clamping brackets 21 and 22 so as to receive a trim pin 26 that is engaged by the swivel bracket 16 so as to set the normal trim position.

The tilt and trim unit 24 is comprised of a fluid motor, indicated generally by the reference numeral 27 which is of the linear type and includes a cylinder assembly 28. The cylinder assembly 28 is formed with an internal bore 29 in which a piston 31 is supported for reciprocation. The piston 31 has affixed to it a piston rod 32 that extends through one end of the housing assembly 28 and which is appropriately sealed. The cylinder assembly 27 is provided with a trunion 33 that permits pivotal attachment of the cylinder assembly to the clamping brackets 21 and 22 by means of a pivot pin 34. In a like manner, the exposed end of the piston rod 32 is formed with a trunion 35 that accommodates pivot pin 36 so as to provide a pivotal connection to the swivel bracket 16. It should be readily apparent that reciprocation of the piston 31 in the cylinder assembly 28 will effect pivotal movement of the outboard motor 11 about the tilt pin 17.

It should be noted that the axis of reciprocation of the fluid motor 27 as indicated by the line Y—Y is offset from the centerline X—X of the outboard motor toward the clamping bracket 22 and spaced from the clamping bracket 21. The reason for this will become apparent.

A power unit, indicated generally by the reference numeral 37 is provided for selectively pressurizing the fluid motor 27 so as to position and control the trim position of the outboard motor 11. The power unit 37, which is shown in part schematically in FIG. 4, includes a reversible fluid motor 38 that is driven by a reversible electric motor 39. In accordance with the invention, the power unit 37 is mounted on one side of the fluid motor 27 and is disposed so that the rotation al axis of the pump 38 and electric motor 39 extend parallel to the line of action Y—Y of the fluid motor 27. In addition, the power unit 37 is nested between the fluid motor 27 and the clamping bracket 21 and contained between the transom 18 and the swivel bracket 16 so that this power unit 37 will be protected from damage by those components. Said another way, the power unit 37 is disposed so that it will be protected by the main components of the outboard drive and none of its critical components are exposed externally so as to be damaged.

The swivel bracket 16 is formed with a first recess 41 that is adapted to receive the upper portion of the fluid motor 27 and contain the pivotal connection to the pivot pin 36 so as to protect these components. The swivel bracket 16 is also formed with a second recess 42 to contain the power unit 37 and to further add to its protection.

Figure 4:
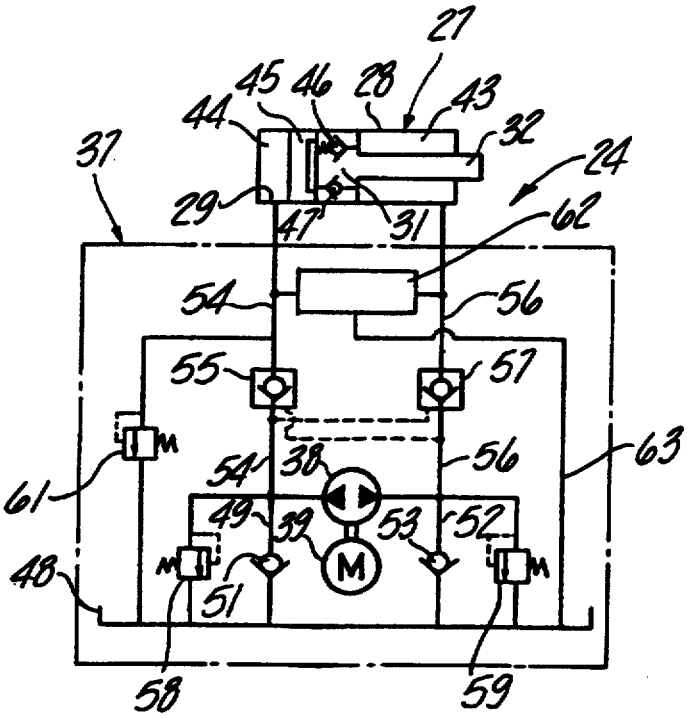
FIG. 4 is a schematic hydraulic circuit showing the construction and operation of the tilt and trim unit.

Referring now to FIG. 4, the construction and operation of the hydraulic system will be described. Considering first that of the fluid motor 27, as has been noted, the piston 31 is slidably supported within the cylinder bore 29. This divides the cylinder bore into a first fluid chamber 43 and a second fluid chamber 44. A floating piston 45 is positioned within the chamber 44 and normally engages the underside of the piston 31 for a reason to be described. A pressure responsive absorber valve 46 controls the flow through the piston 31 from the chamber 43 to the chamber 44 so as to permit the motor 11 to pop up in the event an underwater obstacle is struck. The pressure necessary to open the valve 46 will determine the force necessary to effect popping up of the motor 11. In addition, a pressure responsive return valve 47 permits flow from the chamber 44 to the chamber 43 when the underwater obstacle is cleared. The valve 47 is adapted to open at a substantially lower pressure than that of the value 46 and this pressure is related to the weight of the motor 11 so as to permit the motor 11 to return to its normal running condition once the underwater obstacle has been cleared.

Power tilt and trim operation is controlled by the power unit 37 which, as has been noted, includes a reversible fluid pump 38 of the positive displacement type and a driving reversible electric motor 39. The system includes a fluid reservoir 48 that is formed within the power unit 37 and which can deliver fluid to one side of the pump 38 through a supply line 49 in which a check valve 51 is provided. In a similar manner, a supply line 52, in which a check valve 53 is provided, extends from the reservoir 48 to the opposite side of the pump 38.

The pump 38 has a first delivery line 54 in which a check valve 55 is provided and which delivers fluid to the fluid motor chamber 44. A second delivery line 56 in which a check valve 57 is provided extends to the chamber 43 from the opposite side of the pump. An arrangement is provided whereby opening of the check valve 55 will mechanically cause the check valve 57 to be opened and vice versa, this connection being indicated by the broken lines in FIG. 4. The reason for this will be come apparent.

A tilt up pressure relief valve 58 connects the delivery line 54 with the reservoir 48 for returning fluid to the reservoir 48 when the piston 31 reaches it extreme tilt up position. In a similar manner, a tilt down return valve 59 controls the flow from the delivery line 56 to the reservoir 48 so as to provide relief when the piston 31 reaches its tilt down extreme position.

A further relief valve 61 communicates the chamber 29 with the reservoir 48 through the supply line 54 at a point upstream of the check valve 55 for a reason to be described.

In order to permit manual tilting up of the outboard motor 11 without interference from the hydraulic circuit, a mannually operated valve 62 is interposed between the supply lines 54 and 56 and which is normally closed. When the manually operated valve 62 is opened, the supply lines 54 and 56 may be freely communicative with each other so that fluid may pass between the chambers 43 and 44 without restriction. A makeup line 63 also extends to the valve 62 so as to permit makeup fluid to either enter or leave the reservoir 48 so as to compensate for variations in the displacement of fluid in the chamber 43 by the piston rod 32.

The hydraulic system operates in the following manner. If it is desired to tilt the motor 11 up from its normal running condition as shown in FIG. 1, the motor 39 is energized through an appropriate control circuit so as to cause the pump 38 to pressurize the delivery line 54. Pressurization of the delivery line 54 causes the check valve 55 to open and admit fluid under pressure to the chamber 29. At the same time, opening of the check valve 55 effects mechanical opening of the check 57 so that the line 56 can act as a return line and fluid displaced from the chamber 43 will be returned to the input side of the pump 38. This operation continues until the desired position is reached. If the motor 39 is continued to operate until the outboard motor 11 is fully tilted up, an abrupt rise in pressure in the delivery line 54 will occur and either or both of the relief valves 58 and 61 will open so as to permit fluid to be delivered back to the reservoir 48. If it is desired to effect tilting down of the motor 11 from a raised position, the motor 39 is energized to an appropriate control so as to cause the pump 38 to operate in the direction reverse from that previously described. This will cause the delivery line 56 to be pressurized and effect opening of the check valve 57 so as to deliver fluid under pressure to the motor chamber 43. Opening of the check valve 57 causes a mechanical opening of the check valve 55 so that the line 54 now acts as a return line. As has been noted, the valve 59 will provide pressure relief once the piston 31 reaches the opposite end of its stroke.

The floating piston 45 functions to provide a trim adjustment in the outboard motor through operation of the pump 38 to pressurize the line 54 until the desired position is reached. Then, the piston 45 will engage the piston 31 and retain it in position. The popping up of the motor 11 will continue to be permitted due to the operation of the absorber valve 46 and the motor will return to the position set by the floating piston 45 once the obstacle is cleared. The motor 11 may be trimmed down by applying sudden power from the motor in a forward direction which will cause the force of the piston 31 on the floating piston 45 to overcome the action of the relief valve 61 and force it to open so as to permit the motor to move down.

It should be readily apparent from the foregoing description that a highly effective and yet extremely compact power tilt and trim unit is provided. In addition, the orientation of the elements in such that the components of the power tilt and trim unit will be protected by the outboard motor and its supporting structure from damage.

Although an embodiment of the invention has been illustrated and described, various changes and modifications may be made without departing form the spirit and scope of the invention as, defined by the appended claims.

What is claimed is:

1. A power tilt and trim unit for a marine outboard drive, support means comprising a pair of spaced bracket arms lying on opposite sides of a vertically extending center plane for supporting said outboard drive by the hull of a watercraft for pivotal movement about a generally horizontally extending trim axis, a linear type fluid motor positioned on one side of said center plane between said center plane and one of said bracket arms and having a cylinder housing defining a bore, a piston reciprocal in said bore, a piston rod affixed to said piston and extending from said cylinder housing, said piston rod and said cylinder housing each providing a respective eyelet to receive a pivot pin for effecting a respective pivotal connection between the hull and said outboard drive for effecting pivotal movement of said outboard drive upon actuation of said fluid motor, a pump for actuating said fluid motor, and drive means for said pump, said pump and said drive means being positioned in proximity to said fluid motor and on the other side of said center plane and adjacent to and inboard of the other of said bracket arms, said pump, a trim pin extending between said bracket arms and adjacent the portion of said cylinder housing defining said bore for limiting the trim down adjustment of said outboard drive and for protecting said cylinder housing said drive means and said fluid motor being positioned relative to said outboard drive and said bracket arms to be protected thereby, with said pump, drive means and fluid motor being positioned between the hull and said trim pin, said outboard drive having a pair of portions one of which is positioned to nest in part between said fluid motor and said pump and said drive means on one side of said center plane and the other of which nests in part between said fluid motor and one of said bracket arms, said pair of portions providing the pivotal connection to said fluid motor on said one side of said center plane adjacent said one bracket arm.

2. A power tilt and trim unit as set forth in claim 1 wherein the outboard drive includes a swivel bracket supported for pivotal movement relative to the bracket arms about the generally horizontal extending axis and a drive shaft housing supported for steering movement by said swivel bracket about a generally vertically extending axis, said swivel bracket being positioned to nest in part between the fluid motor and pump and drive means and provide said pivotal connection to said fluid motor.

3. In a power tilt and trim unit as set forth in claim 2 wherein the fluid motor further includes shock absorbing means for providing for shock absorbing pivotal movement of the outboard drive relative to the hull upon the striking of an underwater obstacle.

4. In a power tilt and trim unit as set forth in claim 2 wherein the drive means comprises a motor having a driving axis disposed parallel to the axis of the fluid motor.

5. A power and tilt and trim unit as set forth in claim 2 wherein the unit further includes valve means for selectively operating the fluid motor in response to the rotation of the fluid pump in opposite directions to cause either tilting up or tilting down of the marine outboard drive.

6. A power tilt and trim unit as set forth in claim 5 wherein the fluid motor further includes shock absorbing means.

*7. A power tilt and trim unit for a marine outboard drive, support means comprising a pair of spaced bracket arms lying on opposites sides of a vertically extending center plane for supporting said outboard drive by a hull of a watercraft for pivotal movement about a generally horizontally extending trim axis, a linear type fluid motor positioned between said bracket arms and having a cylinder housing defining a bore, a piston reciprocal in said bore, a piston rod affixed to said piston and extending from said cylinder housing, said piston rod and said cylinder housing each providing a respective eyelet to receive a pivot pin for effecting a respective pivotal connection between the hull and said outboard drive for effecting pivotal movement of said outboard drive upon actuation of said fluid motor, a pump for actuating said fluid motor, and drive means for*

*said pump, said pump and said drive means being positioned in proximity to said fluid motor and adjacent to and inboard of said bracket arms, a trim pin extending between said bracket arms and adjacent the portion of said cylinder housing defining said bore for limiting the trim down adjustment of said outboard drive and for protecting said cylinder housing, said pump, said drive means and said fluid motor being positioned relative to said outboard drive and said bracket arms to be protected thereby, with said pump, drive means and fluid motor being positioned between the hull and said trim pin, said outboard drive having a pair of portions one of which is positioned to nest in part between said fluid motor and said pump and said drive means and the other of which nests in part between said fluid motor and one of said bracket arms, said pair of portions providing the pivotal connection to said fluid motor.*

*8. A power tilt trim unit as set forth in claim 7 wherein the outboard drive includes a swivel bracket supported for pivotal movement relative to the bracket arms about the generally horizontally extending axis and a drive shaft housing supported for steering movement by said swivel bracket about a generally vertically extending axis, said swivel bracket being positioned to rest in part between the fluid motor and pump and drive means and provide said pivotal connection to said fluid motor.*

*9. In a power tilt and trim unit as set forth in claim 8 wherein the fluid motor further includes shock absorbing means for providing shock absorbing pivotal movement of the outboard drive relative to the hull upon the striking of an underwater obstacle.*

*10. In a power tilt and trim unit as set forth in claim 8 wherein the drive means comprises a motor having a driving axis disposed parallel to the axis of the fluid motor.*

*11. A power tilt and trim unit as set forth in claim 8 wherein the unit further includes valve means for selectively operating the fluid motor in response to the rotation of the fluid pump in opposite directions to cause either tilting up or tilting down of the marine outboard drive.*

*12. A power tilt and trim unit as set forth in claim 11 wherein the fluid motor further includes shock absorbing means.*

* * * * *